(12) United States Patent
Mazda et al.

(10) Patent No.: US 6,636,274 B1
(45) Date of Patent: Oct. 21, 2003

(54) IMAGE DISPLAY DEVICE

(75) Inventors: Naoki Mazda, Chigasaki (JP); Ken Itou, Yamato (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/371,223

(22) Filed: Aug. 10, 1999

(51) Int. Cl.⁷ .............................. H04N 3/22; H04N 3/26
(52) U.S. Cl. ................... 348/745; 348/744; 348/750; 348/751; 348/658; 348/657
(58) Field of Search ................... 348/745, 744, 348/746, 747, 750, 751, 756, 757, 788, 789, 818, 842, 602, 603, 658, 657, 191

(56) References Cited

U.S. PATENT DOCUMENTS

| | | | | |
|---|---|---|---|---|
| 4,611,245 A | * | 9/1986 | Trias ........................ 348/762 |
| 5,519,518 A | * | 5/1996 | Watanabe et al. ............. 349/57 |
| 5,526,063 A | * | 6/1996 | Joubert et al. .............. 348/744 |
| 5,694,180 A | * | 12/1997 | Deter et al. ................ 348/746 |
| 5,916,461 A | * | 6/1999 | Costin et al. .......... 219/121.68 |
| 5,920,361 A | * | 7/1999 | Gibeau et al. .............. 348/750 |
| 6,055,057 A | * | 4/2000 | Hoeft ........................ 356/629 |
| 6,091,461 A | * | 7/2000 | Bardmesser ................. 348/195 |
| 6,154,259 A | * | 11/2000 | Hargis et al. ............... 348/756 |
| 6,219,011 B1 | * | 4/2001 | Aloni et al. ................. 345/1.3 |
| 6,224,216 B1 | * | 5/2001 | Parker et al. ................. 345/46 |
| 6,246,446 B1 | * | 6/2001 | Heimbuch et al. .......... 348/750 |
| 6,273,571 B1 | * | 8/2001 | Sharp et al. ................ 348/742 |
| 6,330,040 B1 | * | 12/2001 | Kawashima ................. 348/744 |
| 6,362,912 B1 | * | 3/2002 | Lewis et al. ................ 348/746 |
| 2001/0007483 A1 | * | 7/2001 | Chauvin et al. ............ 348/745 |

FOREIGN PATENT DOCUMENTS

JP          7-235694          9/1995

* cited by examiner

Primary Examiner—John Miller
Assistant Examiner—Linus H. Lo
(74) Attorney, Agent, or Firm—Pillsbury Winthrop LLP

(57) ABSTRACT

When an anomaly occurred in an optical system or light sources of a rear projection TV in which laser beams are employed as a light source, the anomaly is detected by sensors, the detected anomaly is transmitted to a microcomputer, and according to a signal from the microcomputer a laser light source control portion controls the laser beams from the laser light sources so as to stop or decrease generation of the laser beams. Thereby, danger is prevented in advance from being afflicted on a viewer.

11 Claims, 7 Drawing Sheets

IMAGE DISPLAY DEVICE

BACKGROUND OF THE INVENTION

1. Field of the Invention

The present invention relates to an image display device that displays images on a screen with a laser beam as a light source.

2. Description of Related Art

In an image display device that displays images on a screen with a laser beam as a light source, since a laser light source is a light source of very high energy, the laser beam when touched therewith may cause some danger to the human body. When a laser beam from a light source undergoes normal beam modulation by the use of constituent elements of an optical system, the energy of the laser beam that is irradiated on a unit area induces no problem because of reduction of the intensity thereof to the degree that does not cause harmful affect to the human body.

However, there is a case that due to a trouble of, for instance, a lens for beam modulation, such a problem occurs that the laser beam is not sufficiently modulated as a beam. Also when being in a state where the beam modulation is not implemented, that is, when the laser beam is irradiated concentrated in a small area, the laser beam is kept in a state where the laser beam is irradiated without beam modulation, and information that the instrument is in such a state is not given outside. When the laser beam touches the human body, there is the likelihood of causing serious problems such as a burn, lowering of eyesight, loss of eyesight or the like. In addition, according to PL Law (Product Liability Law), liability of the manufacturers is called on. Accordingly, serious economic damage might be given on the manufacturers.

As mentioned above, in the case of an image display device in which an existing laser beam is used as a light source being employed, when due to trouble of a lens for beam modulation or the like, the beam modulation of laser beam is not implemented sufficiently, serious problems might result.

SUMMARY OF THE INVENTION

An object of the present invention is to prevent accidents due to laser beam of an image display device from occurring, wherein images are displayed on a screen by the use of laser beam of high energy as a light source.

DETAILED DESCRIPTION OF THE PREFERRED EMBODIMENTS

In the following, embodiments of the present invention will be explained in detail with reference to the drawings.

Figure 1:
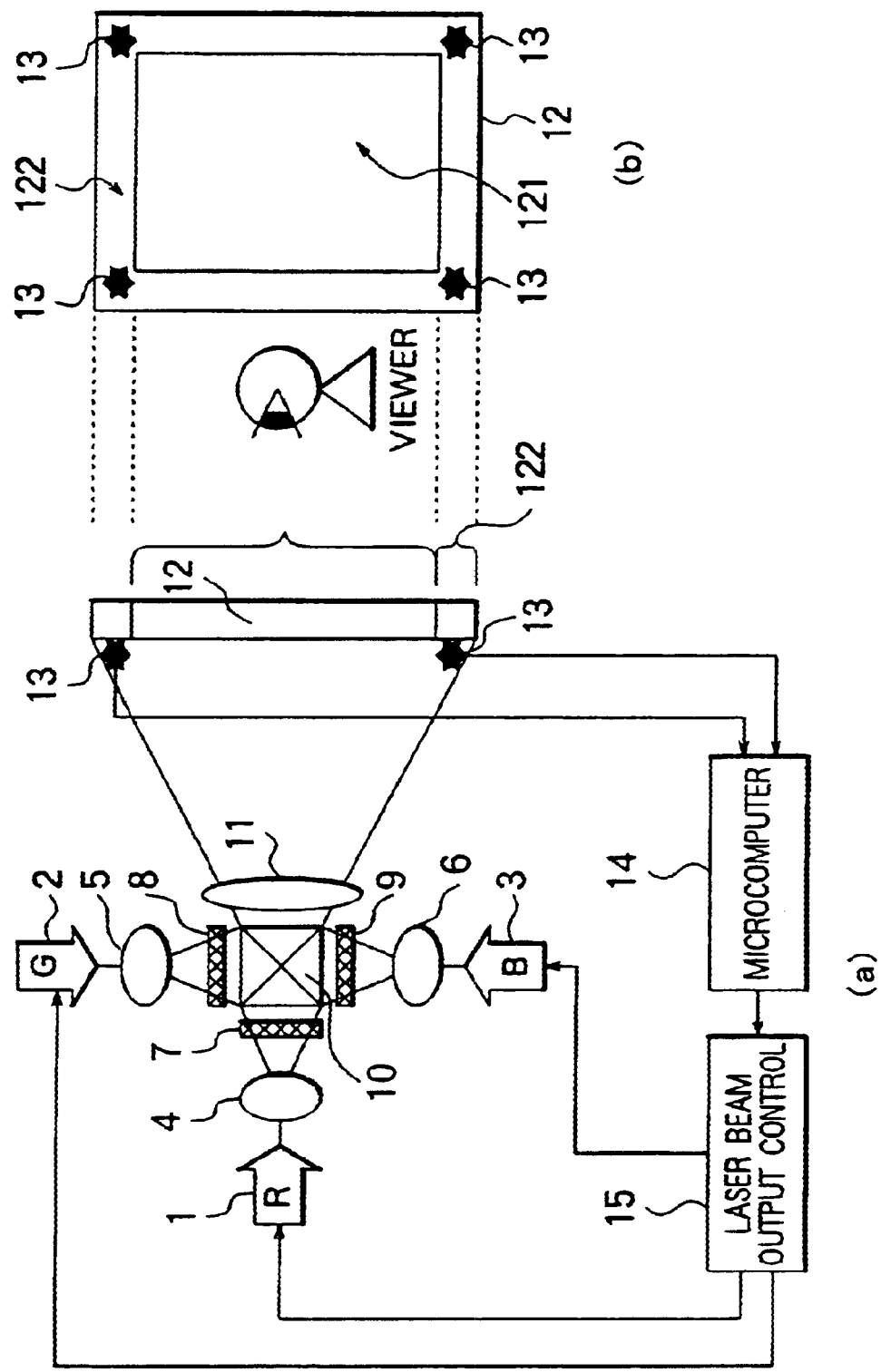
FIG. 1 is system diagrams for explaining a first embodiment of the present invention.

FIG. 1 is drawings for explaining a first embodiment of the present invention in which the present invention is applied in a television projected from back-side (a rear projection television) of which light source is laser beam.

FIG. 1(a) is a system diagram showing a rear projection TV in an ordinary state of use. The respective laser beams emitted from RGB laser light sources 1 to 3 undergo a beam modulation by lenses 4 to 6, respectively. Then, these laser beams are allowed to pass through liquid crystal panels 7 to 9 for displaying images, respectively. Thereafter, the respective components of RGB are compounded by the use of a dichroic mirror 10. Then, after allowing passing through a projection lens 11, the compounded beam is projected from a rear face of a screen 12 to display images.

The projected laser beams are detected by sensors 13 as to whether the laser beams are projected in a state where the sizes of the beams are varied or the beams undergo the modulation such as diffusion or the like. The sensors 13, as shown in FIG. 1(b) that shows a state that sees a screen 12 from a front side, are disposed at four corners of a periphery 122 outside of an effective image area 121 on a screen 12, and do not disturb viewers. The outputs of the sensors 13 are sent to a microcomputer 14 to judge states of the laser beams projected on the screen 12. The result of this is transmitted to a laser output control 15 to control the output of the laser light sources 1 to 3.

The microcomputer 14, when all the sensors 13 detected that the outputs of the laser beams were projected with intensity of more than a threshold value, judges that the laser beams are irradiated normally and allows the laser light sources 1 to 3 to continue the irradiation. When all the sensors 13 detected that the laser beams were not irradiated with intensity of more than a threshold value, the irradiation of the RGB light sources 1 to 3 is ceased or reduced.

Thus, when all the sensors 13 detected that the beams were not irradiated with intensity of more than a threshold value, the microcomputer judges that the laser beams are irradiated without undergoing the beam modulation. Thereupon, by the use of a laser output control 15 that is provided with a function to restrict the amount of beam of laser light sources 1 to 3, laser oscillation is ceased or reduced to prevent in advance troubles from occurring.

Incidentally, in FIG. 1, only an example is shown in which a sensor is disposed at each corner of the four corners outside the effective area of a screen. However, with the other arrangement than the above, the identical effect can be obtained. Further, when detecting the laser beams by the use of sensors disposed at a plurality of positions, the sensors need only be disposed with arrangement, number of pieces and number of simultaneous detection that can detect that the beam modulation is implemented over the area of the minimum limit from a safety point of view. Further, it is not necessary for the microcomputer to judge that only when all the disposed sensors detected the laser beams, over the area of the minimum limit from a safety point of view, the laser beams are irradiated under the beam modulation. It needs only be confirmed that in the area of the minimum limit from a safety point of view, the beam modulation is implemented.

Figure 2:
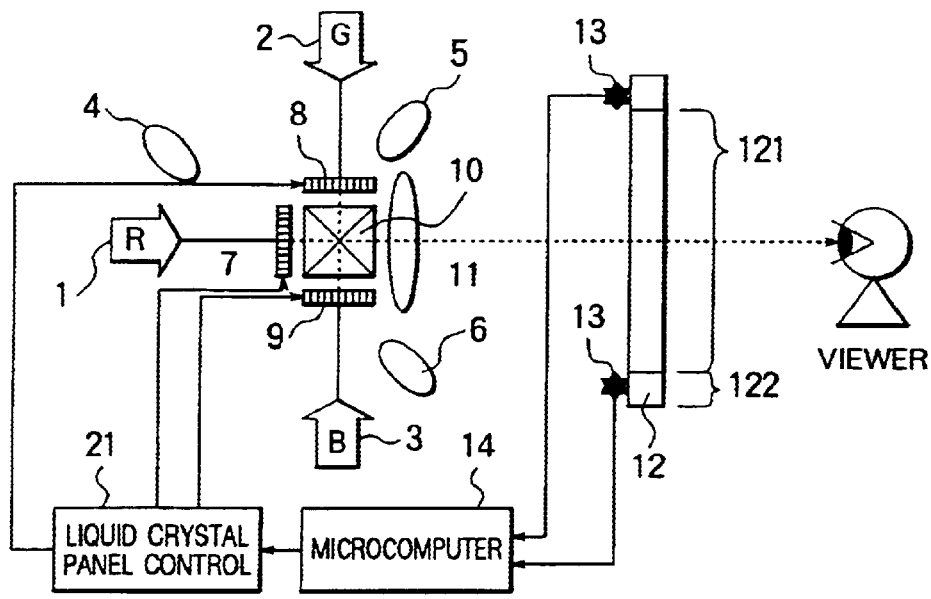
FIG. 2 is a system diagram for explaining a second embodiment of the present invention.

FIG. 2 is a system diagram for explaining a second embodiment of the present invention. For the portions of the identical functions as FIG. 1, the identical reference numerals are given and explanation for these is omitted. In this embodiment, cut-off of the laser beam is not implemented through control of outputs of the laser light sources 1 to 3. Instead, based on information that notifies that the sensors 13 are abnormal, the microcomputer 14 lets a liquid crystal panel control 21 control the liquid crystal panels 7 to 9 so as to cut off the laser beams passing through the liquid crystal panels 7 to 9.

In this embodiment, when the microcomputer 14 judged that the laser beams were irradiated without being modulated and might be dangerous, the laser beams are cut off from transmitting by the use of the liquid crystal panels 7 to 9 and are thereby prevented from going outside. Thereby, the danger can be prevented from occurring.

If the laser beams can be prevented from going outside, instead of a transmission liquid crystal panel, with for instance an image display device such as a reflection liquid crystal display device, a digital mirror device or the like, the similar effect can be obtained.

Figure 3:
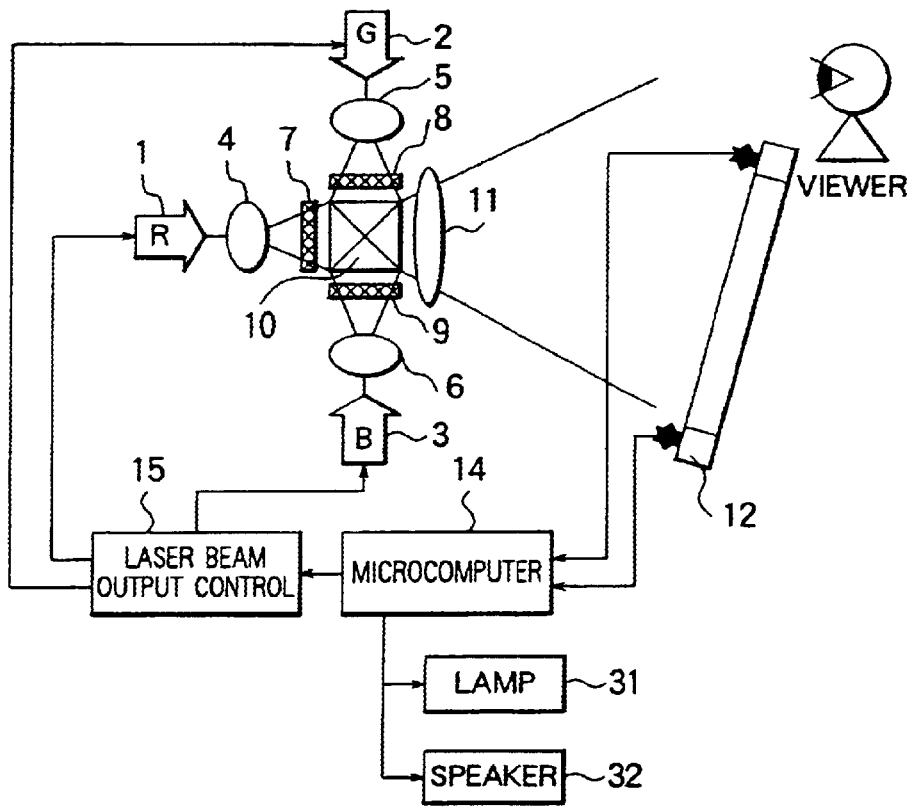
FIG. 3 is a system diagram for explaining a third embodiment of the present invention.

A third embodiment of the present invention will be a explained with reference to FIG. 3. The portions that have the identical functions as FIG. 1 are given the same reference numerals for explanation. This embodiment handles a case when a screen of a rear projection TV comes off.

That is, under a state where a rear projection TV is operated, the laser beams are detected not irradiating the sensors 13. As such a sensor, there is a photodiode for instance. Based on the information from the sensors 13, the microcomputer 14 sends a signal to a laser light source control 15 so as to stop or reduce the emission of the laser beams, and notifies any trouble or an anomaly outside the device by the use of warning means such as an alarm sound or an alarm lamp due to a lamp 31 or a speaker 32.

Thus, when the screen comes off, the laser output is stopped or reduced and by notifying any trouble or an anomaly outside the device through on/off of an alarm sound or alarm lamp, trouble can be prevented in advance from occurring.

Figure 4:
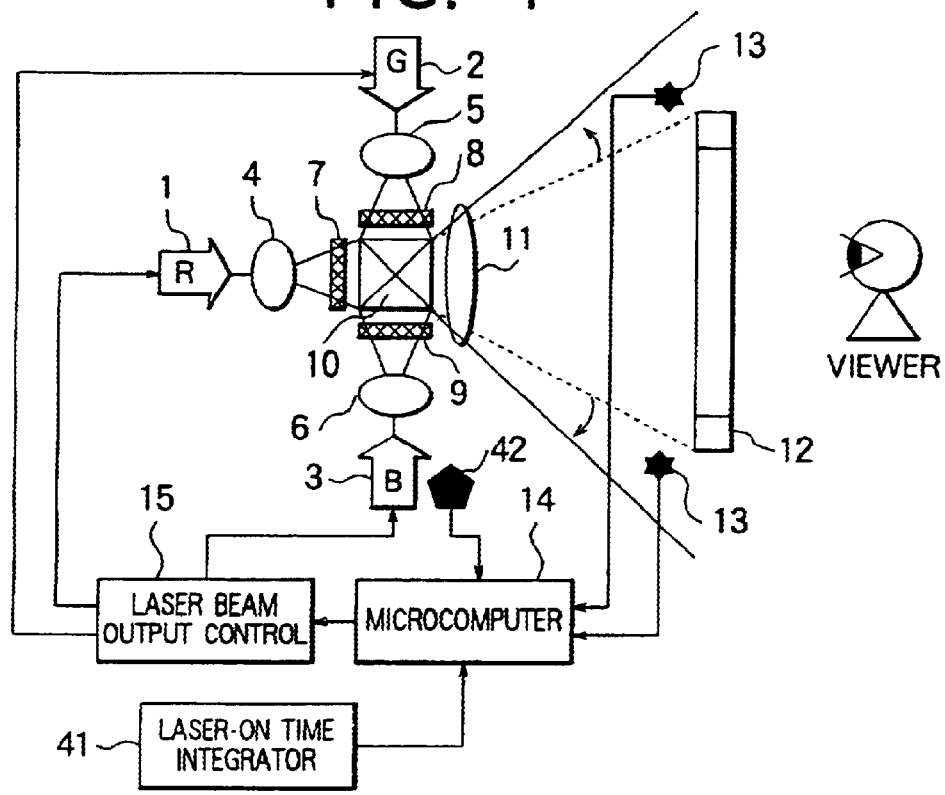
FIG. 4 is a system diagram for explaining a fourth embodiment of the present invention.

FIG. 4 is a system diagram for explaining a fourth embodiment of the present invention. The portions of the identical functions as FIG. 1 are given the identical reference numerals as FIG. 1 for explanation. In this embodiment, as the result of a position thereto a projection lens 11 is attached coming off an ordinary position, compared with an ordinary state of use, the beam modulation larger than ordinary one is implemented.

That is, in this case, it is detected that the laser beams are irradiated to the area outside the screen 12. In this case, the sensors 13 are disposed at the area outside the area that is irradiated in an ordinary state of use that is shown by dotted lines in the figure. When the sensors 13 detect the laser beams, the outputs of the laser light sources 1 to 3 are controlled. An integrated turn-on time period of the laser beam is integrated by the use of an integrating meter 41 of turn-on time period of the laser. In addition, by giving a weight thereto by the use of an environment temperature of the laser detected by a temperature sensor 42 during turning-on, the decrease of the emission efficiency of the laser light source can be taken into consideration. With this decrease, the threshold for judging whether the laser is irradiated or not can be optimized.

Thus, when the microcomputer 14 sends a signal to a laser light source control 15 so as to control a laser output, considering the decrease of the emission efficiency of the laser light source, the optimization of a threshold value for judging whether there is an irradiation of the laser light or not can be materialized. Thereby, a more accurate judgement of the laser output can be carried out.

In the case of this embodiment, in a system where during a power source being turned on the laser light source is also mostly turned on, the integrated turn-on time period of the laser beam may be equivalently replaced by a power source turn-on time period to exhibit the similar effect. In addition, other than controlling the output of the laser light source, as identical as FIG. 2, the laser light beam may be cut-off. The display device is not restricted to the liquid crystal panel.

Figure 5:
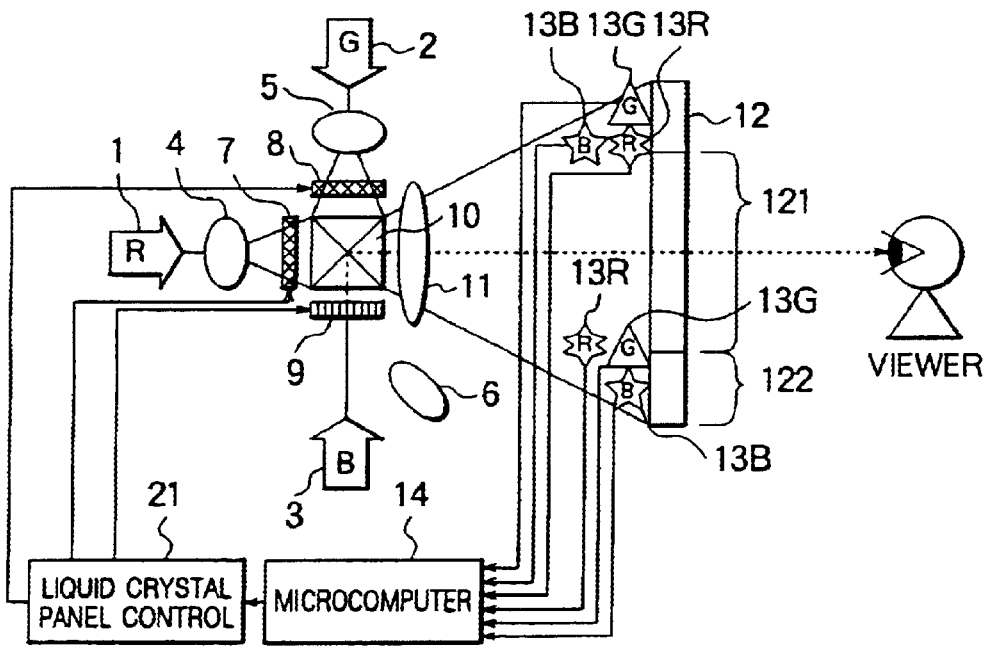
FIG. 5 is a system diagram for explaining a fifth embodiment of the present invention.

A fifth embodiment of the present invention shown in FIG. 5 will be explained. The portions of the identical functions as FIG. 2 are given the identical reference numerals for explanation. The laser beams of the RGB laser light sources 1 to 3, undergoing optical modulation due to the liquid crystal panels 7 to 9, are projected on a screen 12. At this time, the sensors 13R, 13G and 13B detecting exclusively R, G and B respectively are disposed outside the effective screen area 122 of the screen 12. Thereby, when an anomaly occurred in any one of 1 to 3 of the laser light sources, the anomaly can be detected, resulting in improvement of certainty.

In this case, as a means for cutting-off the laser beam, a liquid crystal panel is employed. However, as identical as FIG. 4, the laser light sources themselves can be controlled.

Figure 6:
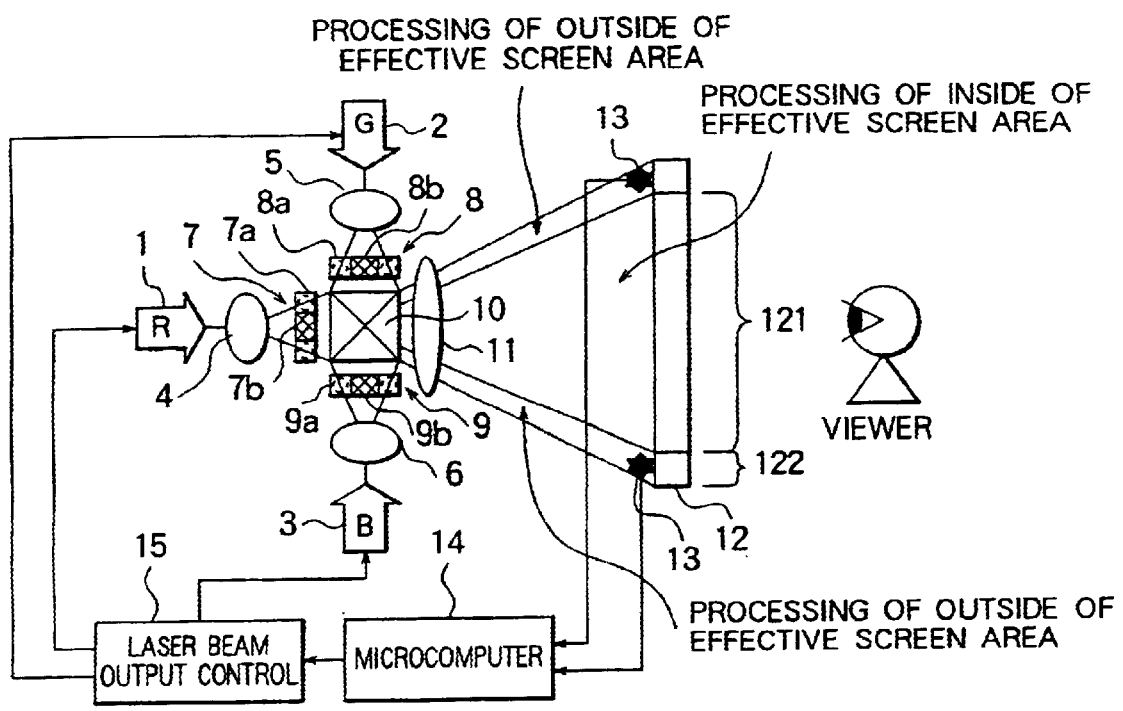
FIG. 6 is a system diagram for explaining a sixth embodiment of the present invention.

FIG. 6 is a system diagram for explaining a sixth embodiment of the present invention. The portions of identical functions as FIG. 1 are given the identical reference numerals for explanation. As in FIG. 1, when the sensors 13 are disposed outside 122 of an image effective area, that is in an over-scanned portion of images, depending on the content of the image signals, whether the detection is due to the abnormal operation of the light source or due to variation due to the modulation operation of the liquid crystal panel may be mal-detected.

In order to avoid such a mal-detection, in this embodiment, the portions of the liquid crystal panels 7 to 9 corresponding to the portions that irradiate the sensors 13 are assigned as portions 7a to 9a that process exclusively the outside of the effective image area respectively, and the inside thereof are assigned as portions 7b to 9b that process exclusively the inside of the effective image area respectively. The laser beams that pass through the portions 7a to 9a that process exclusively the outside of the effective image area are detected by the sensors 13 to optimize, thereby the aforementioned mal-detection can be prevented from occurring.

In the optimization operation of the portions 7a to 9a hat process exclusively the outside of the effective image areas of the liquid crystal panels 7 to 9, with the operation of the liquid crystal panels 7 to 9 corresponding to the sensors 13 opened entirely, the laser beam can be transmitted always without any relation with the image signals.

Figure 7:
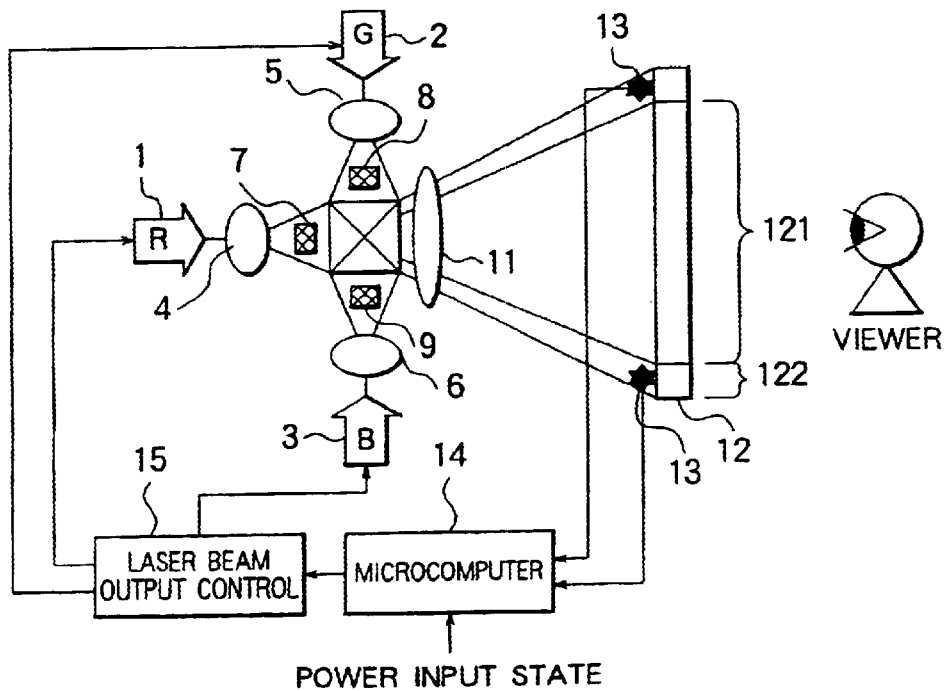
FIG. 7 is a system diagram for explaining a seventh embodiment of the present invention.

FIG. 7 is a system diagram for explaining a seventh embodiment of the present invention. In FIG. 6, the state of operation of the liquid crystal panels 7 to 9 is optimized inside 121 the effective image area and outside 122 the effective image area independently from each other. However, in this embodiment, only inside of the effective image area, the beam modulation due to the liquid crystal panels 7 to 9 is implemented. To the laser beam reaching outside 122 of the effective image area where the sensors 13 are disposed, the beam modulation due to the liquid crystal panels 7 to 9 is not implemented.

Thereby, the sensors 13 that sense the laser beams undergone the beam modulation operation of the liquid crystal panels 7 to 9 can be prevented from malfunctioning.

Figure 8:
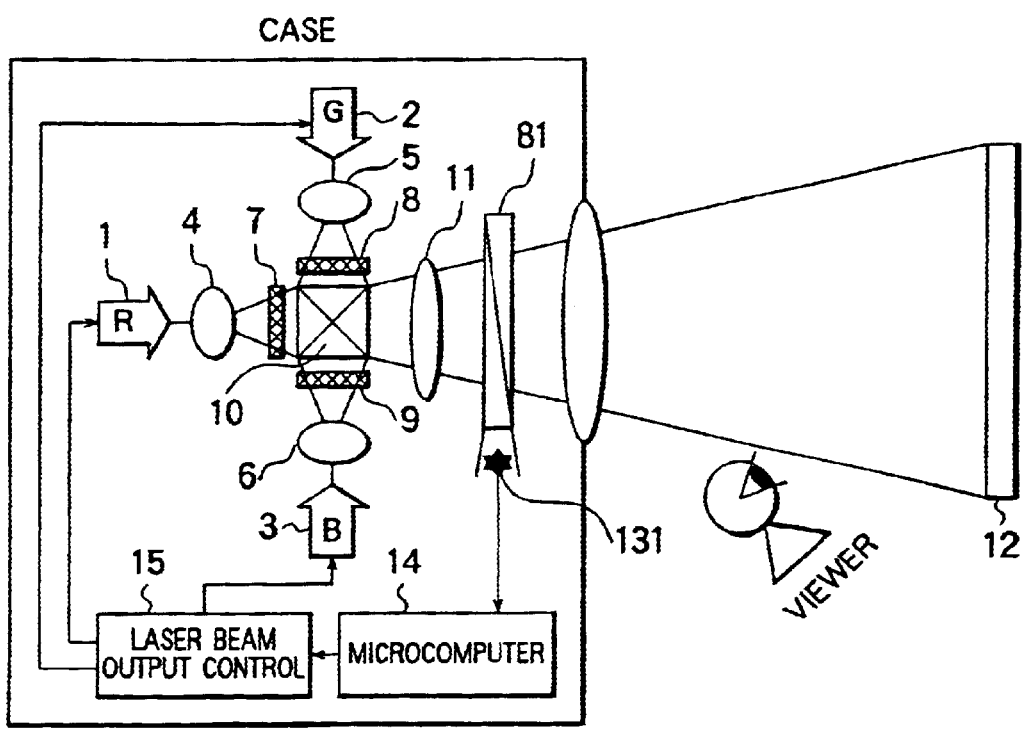
FIG. 8 is a system diagram for explaining an eighth embodiment of the present invention.

FIG. 8 is a system diagram for explaining an eighth embodiment in which the present invention is applied to a front projector in which laser beams are employed as light sources. To the portions of the identical functions as FIG. 1, the identical reference numerals are given for explanation.

In a front projector, there may be a case when a sensor for detecting the laser beam is disposed with difficulty in light-path. In this case, in the midway of the light-path a beam-splitter 81 is disposed to branch the beams projected from the laser light sources 1 to 3. By dividing one of the branched beams for projection use and the other for the sensor use, a sensor 131 for detecting the laser beam can be disposed. Accordingly, based on the situation in which the sensor 131 senses the laser beam, the laser light sources 1 to 3 are controlled.

In this embodiment, even in a front projector in which laser beams are used as light sources, the danger to viewers can be prevented in advance from occurring.

Figure 9:
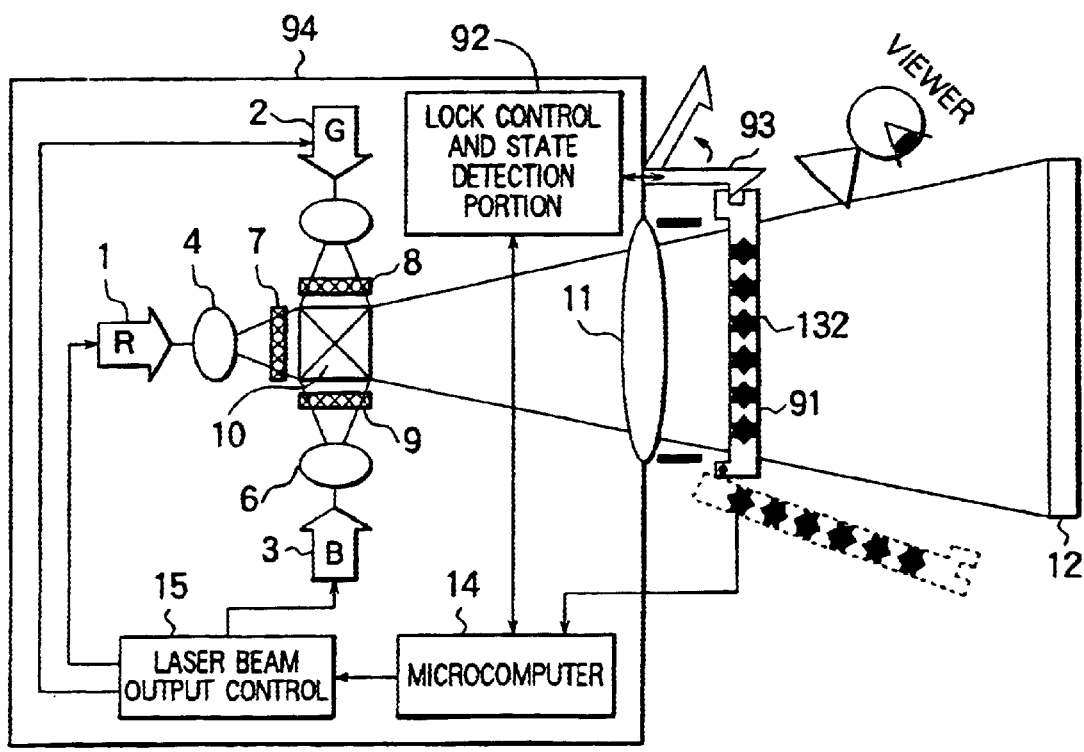
FIG. 9 is a system diagram for explaining a ninth embodiment of the present invention.

FIG. 9 explains a ninth embodiment of the present invention in which the present invention is applied to a front projector in which laser beams are employed as light sources as identical as FIG. 8. In the figure, the portions of the identical functions are given the same reference numerals for explanation.

In a front projector, a lens cover 91 is generally disposed to protect a projection lens 11. A plurality of laser beam sensors 132 is disposed on the lens cover 91. The results detected thereby are transmitted to a microcomputer 14 to confirm whether the beam modulation is implemented sufficiently to secure safety not. Based on this information, the microcomputer 14 sends a signal to a lock control and state detection portion 92 to drive a lock mechanism 93 of the lens cover 91 toward a direction of arrow. Thereby, the lens cover 91 is freed to the position shown by the dotted line to allow irradiate the laser beams outside of the case 94.

As a result of detection due to the sensors 132, when it is judged that the laser beam is not sufficiently modulated in beam modulation, by holding the lock mechanism 93 of the lens cover 91 not to be freed, the light beam of high energy is prevented from being irradiated outside the case 94 without undergoing beam modulation.

In this embodiment, an example of a lens cover is shown. However, without restricting to this, other than the lens cover any constituent element capable of shielding the light-path can be employed. By disposing a sensor and a lock mechanism to this shield, the identical function can be obtained.

Figure 10:
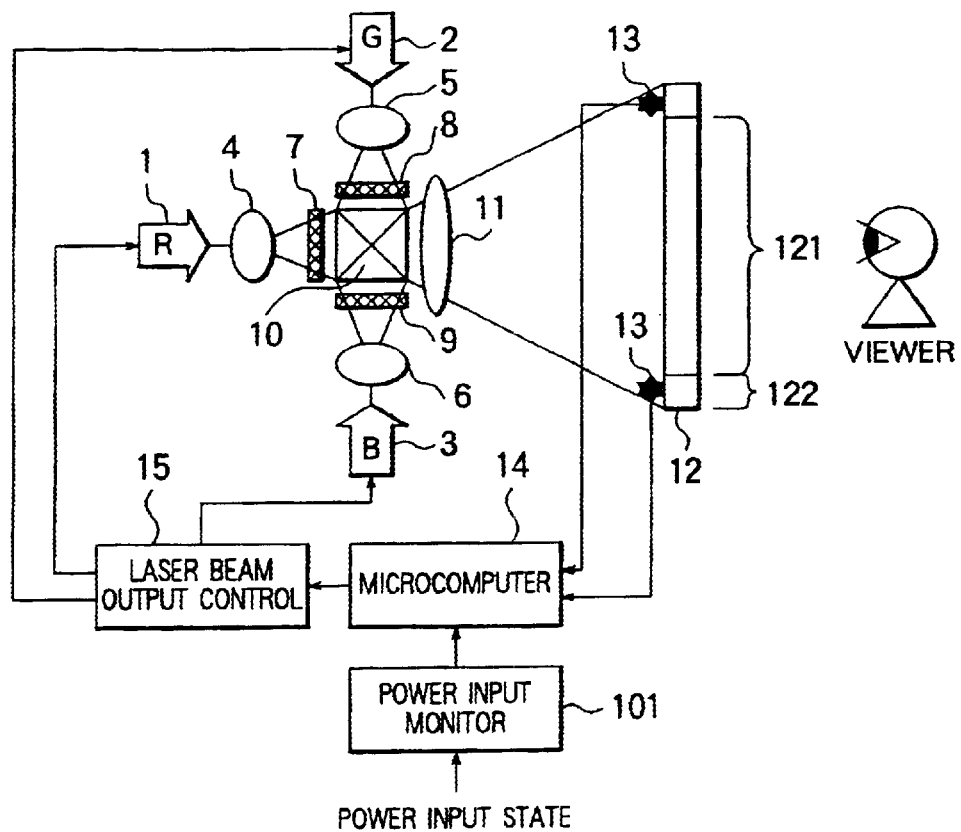
FIG. 10 is a system diagram for explaining a tenth embodiment of the present invention.

FIG. 10 is a system diagram for explaining a tenth embodiment of the present invention. In this embodiment, a monitor 101 that senses an input time of power source is disposed. When the power source is turned on, oscillation outputs of the laser beams are suppressed to a lower level than ordinary one to secure safety. In such a state, the laser beams are confirmed to go through the normal path. Thereafter, the oscillation outputs of the laser beams are raised to the level of ordinary output. Thereby, the laser is prevented from inadvertently oscillating with a higher output.

Incidentally, in this embodiment, an example of application to a rear projection TV is shown. However, the present invention can be used in combination with the other system.

Figure 11:
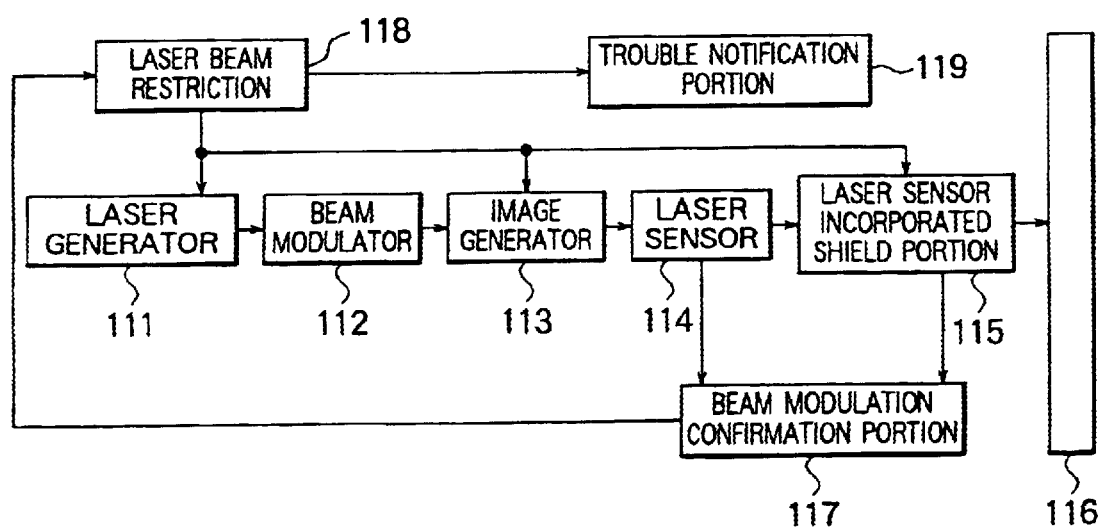
FIG. 11 is a system diagram for explaining an eleventh embodiment of the present invention.

With FIG. 11, an eleventh embodiment of the present invention in which the present invention is employed in a projection will be explained.

A laser beam emitted from a laser generator 111 undergoes beam modulation at a beam modulation portion 112. The laser beam, after being modulated into images at an image generating portion 113 such as a liquid crystal panel or the like, is projected onto a screen 116 through a laser sensor 114 or a shield portion 115 that incorporates a laser sensor therein the laser sensor is disposed on a detachable shield portion. The beam modulation of the laser beam after a beam modulation portion 112 or an image generation portion 113 is confirmed at a beam modulation confirmation portion 117. When judged that the beam modulation is not carried out normally, a laser beam restriction 118 gives a restriction such as an attenuation or stoppage of irradiation of the laser beam at the laser generation portion 111 or the image generation portion 112 or the shield portion 115. Further, at this time, a trouble notification portion 119 notifies an anomaly outside the system.

Incidentally, the laser sensor 114 and the shield portion 115 that incorporates a laser sensor are not necessarily required to comprise at the same time. Even when the beam modulation portion 112 is disposed as a posterior stage of the image generation portion 113, a similar effect can be obtained. The laser sensor 114 and the shield portion 115 that incorporates a laser sensor are not necessarily required to dispose after the beam modulation portion 112 and the image generation portion 113. Only by disposing after the laser generation portion 111, the identical effect can be obtained.

Figure 12:
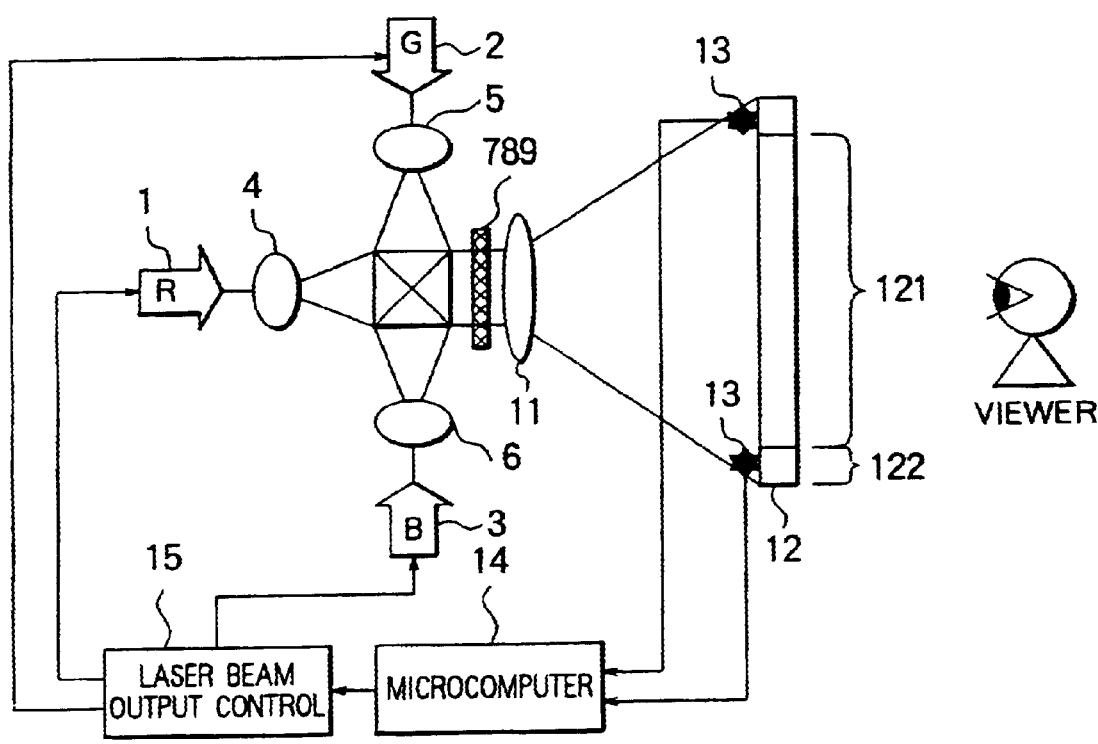
FIG. 12 is a system diagram for explaining a twelfth embodiment of the present invention.

FIG. 12 is a system diagram for explaining a twelfth embodiment of the present invention. In this embodiment, each of the laser light sources 1 to 3 of the respective RGB is let to emit sequentially with high speed. With this timing, each image corresponding to the respective RGB is modulated by the use of a piece of liquid crystal panel 789. The identical reference numerals are given to the portions of identical functions as FIG. 1.

Namely, by switching the respective images of RGB with high speed to display, despite of lack of pixels that are used exclusively for the respective RGB on a liquid crystal panel 789, images composed of RGB can be obtained. Accordingly, a display device of effectively identical number of pixels can be realized with a liquid crystal panel of a smaller number of pixels.

Further, when a liquid crystal panel 789 of the identical number of pixels is used, since each pixel is not assigned exclusively to the respective RGB, the number of pixels can be increased in effect. When constituted like this, the laser light sources of the respective RGB repeat on/off with high speed synchronized with the timing that drives the liquid crystal panel 789. At the rise time of on/off of the laser light source, the laser beam is detected of whether the beam modulation is carried our normally or not. When the beam modulation is not carried out normally, the laser output is restricted.

In this case, the detection of the beam modulation at the rise time of on/off of the laser light sources is not required to carry out each time. Even a number of times subtracted from the number of times of on/off of the laser light sources can suffice to obtain the identical effect.

As explained above, in an image display device of the present invention in which laser light sources are employed, an anomaly when occurred in an optical system or light sources can be detected to avoid trouble being inflicted on viewers by controlling the laser light at the time of difficulty.

In the aforementioned respective embodiments, a laser beam is employed as light source. However, the light source is not restricted to the laser beam and the present invention can be applied to any light source that might cause danger on the human body.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims is to be embraced within their scope.

This invention is disclosed in Japanese Patent Application No. 11-070764 filed on Mar. 16, 1999, and the entire disclosure thereof is incorporated herein by reference.

What is claimed is:

1. An image display device, comprising:

means for generating a laser beam;

means for generating a picture by passing the laser beam through a liquid crystal panel;

means for broadening the laser beam passed through the liquid crystal panel to project the picture onto a screen;

means for detecting an intensity of the laser beam and determining whether the laser beam broadening means operates normally or not;

means for restricting the laser beam when the detecting means detects that the beam broadening means is not operating normally; and means for attenuating the laser beam to a lower level than a level than in normal use when the means for generating a laser beam starts generating the laser beam and during confirmation that the means for broadening laser beam is operating normally, thereafter the laser beam being the level in normal use.

2. The image display device as set forth in claim 1 wherein the means for detecting an intensity of the laser beam and determining whether the laser beam broadening means is operating normally or not, comprises at least one means disposed at least on a light path or in the neighborhood thereof that is employed for detecting the laser beam.

3. The image display device as set forth in claim 1 wherein the means for detecting an intensity of the laser beam and determining whether the laser beam broadening means is operating normally or not, comprises a means for detecting the laser beam coming off a normal light path.

4. The image display device as set forth in claim 2 wherein the means for detecting an intensity of the laser beam and determining whether the laser beam broadening means operates normally or not detects the laser beam at a plurality of positions.

5. An image display device, comprising:

a plurality of means for generating a laser beam;

means for generating a picture by passing the laser beam through a liquid crystal panel;

means for broadening the laser beam passed through the liquid crystal panel to project the picture onto a screen;

means for detecting an intensity of each laser beam separately and determining whether the laser beam broadening means is operating normally or not;

means for restricting a plurality of the laser beams when even only one of the plurality of the laser beams broadened by the laser beam broadening means is detected to be not operating normally; and means for attenuating the laser beam to a lower level than a level in normal use when the means for generating a laser beam starts generating the laser beam and during confirmation that the means for broadening the laser beam is operating normally, thereafter the laser beam being the level in normal use.

6. The image display device as set forth in claim 1 further comprising means for detecting deformation given to constitution, structure or shape of the image display device and, when any deformation is detected, restricting the laser beam.

7. The image display device as set forth in claim 4 further comprising means for detecting deformation given to constitution, structure or shape of the image display device and, when any deformation is detected, restricting the laser beams.

8. The image display device as set forth in claim 5 further comprising means for detecting deformation given to constitution, structure or shape of the image display device and, when any deformation is detected, restricting the laser beams.

9. An image display device, comprising:

means for generating a laser beam;

means for generating a picture by passing the laser beam through a liquid crystal panel;

means for broadening the laser beam passed through the liquid crystal panel to project the picture onto a screen;

a plurality of sensors which are disposed at a periphery outside of an effective image area on the screen, which detect whether the laser beam is projected in a state where the size of the laser beam is varied or the laser beam undergo the broadening and which detect intensity of the laser beam whether the laser beam broadening means operates normally or not;

means for restricting the laser beam when the sensors detect that the laser beam broadening means is not operating normally; and means for attenuating the laser beam to a lower level than a level in normal use when the means for generating a laser beam starts generating the laser beam and during confirmation that the means for broadening the laser beam is operating normally, thereafter the laser beam being the level in normal use.

10. The image display device as set forth in claim 9 at least one of the sensors being disposed on a corner of a periphery outside of an effective image area on the screen.

11. The image display device as set forth in claim 10 the sensors being disposed at four corners of a periphery outside of an effective image area on the screen.

* * * * *